(12) United States Patent
Ryoo

(10) Patent No.: US 6,793,135 B1
(45) Date of Patent: Sep. 21, 2004

(54) ELECTRONIC PAYMENT SYSTEM USING MULTIFUNCTIONAL PREPAID CARDS AND METHOD OF SELLING PREPAID CARDS

(75) Inventor: Chang Wan Ryoo, Seoul (KR)

(73) Assignee: Dacom Cyberpass Inc., Seoul (KR)

( * ) Notice: Subject to any disclaimer, the term of this patent is extended or adjusted under 35 U.S.C. 154(b) by 106 days.

(21) Appl. No.: 09/806,481

(22) PCT Filed: Jun. 16, 2000

(86) PCT No.: PCT/KR00/00639

§ 371 (c)(1),
(2), (4) Date: Apr. 12, 2001

(87) PCT Pub. No.: WO01/41036

PCT Pub. Date: Jun. 7, 2001

(30) Foreign Application Priority Data

Nov. 30, 1999 (KR) ........................................ 1999-53981

(51) Int. Cl.[7] .............................................. G06K 15/00
(52) U.S. Cl. ...................... 235/383; 235/380; 235/381; 235/382; 705/64; 705/69; 705/70; 705/72
(58) Field of Search ................................ 235/380, 379, 235/383, 382, 381, 382.5; 705/35, 41, 43, 64, 69, 70, 72

(56) References Cited

U.S. PATENT DOCUMENTS

| | | | | |
|---|---|---|---|---|
| 5,353,335 | A | | 10/1994 | D'Urso et al. ................. 379/67 |
| 5,870,718 | A | * | 2/1999 | Spector ........................ 705/26 |
| 5,945,653 | A | * | 8/1999 | Walker et al. ............... 235/380 |
| 5,991,413 | A | * | 11/1999 | Arditti et al. .................. 705/77 |
| 6,024,288 | A | * | 2/2000 | Gottlich et al. ............. 235/493 |
| 6,076,076 | A | * | 6/2000 | Gottfreid ...................... 705/45 |
| 6,138,106 | A | * | 10/2000 | Walker et al. ................. 705/14 |
| 6,182,895 | B1 | * | 2/2001 | Albrecht ...................... 235/380 |
| 6,189,787 | B1 | * | 2/2001 | Dorf ........................... 235/380 |
| 6,442,532 | B1 | * | 8/2002 | Kawan ......................... 705/35 |
| 6,467,684 | B2 | * | 10/2002 | Fite et al. .................... 235/379 |
| 6,473,500 | B1 | * | 10/2002 | Risafi et al. ........... 379/144.01 |
| 6,615,189 | B1 | * | 9/2003 | Phillips et al. ................ 705/41 |
| 6,654,600 | B1 | * | 11/2003 | Pollak et al. ............... 455/405 |

FOREIGN PATENT DOCUMENTS

| | | |
|---|---|---|
| JP | 10-302126 A | 11/1998 |
| JP | 11-25171 A | 1/1999 |
| JP | 11-86132 A | 3/1999 |
| JP | 2002314718 | * 10/2002 |

* cited by examiner

Primary Examiner—Michael G. Lee
Assistant Examiner—Ahshik Kim
(74) Attorney, Agent, or Firm—Jacobson Holman PLLC

(57) ABSTRACT

There are provided an electronic payment system using a multifunctional prepaid card which is commonly used in payment for use of services and purchase of goods, and a method of selling the multifunctional prepaid card. The electronic payment system includes a multifunctional prepaid card having a predetermined Personal Identification Number (PIN), shopping/service providing means for providing services and goods to a user of the multifunctional prepaid card and requesting the PIN of the multifunctional prepaid card for payment, and a prepaid card management system for managing state/balance information for PIN for the multifunctional prepaid card on a database, making a settlement by referring to the balance amount of the corresponding PIN if payment for a specific PIN is requested by the shopping/service providing means, and updating the settlement result on the database. Thus, according to the electronic payment system, a single multifunctional prepaid card can be comprehensively used in payment for use of various services and for purchases of goods.

9 Claims, 16 Drawing Sheets

FIG. 10A

PURCHASE/USE OF CYBER PASS          PURCHASE OF CYBER PASS

You don't have to purchase several cyber passes.
   A single cyber pass is rechargeable.

▶ Select the amount of cyber pass you want to buy and enter the quantity
(1-99)
   5,000-won valued card  \_\_\_\_    30,000-won valued card  \_\_\_\_
   10,000-won valued card  \_\_\_\_   50,000-won valued card  \_\_\_\_
   20,000-won valued card  \_\_\_\_   100,000-won valued card  \_\_\_\_

▶ If you want to add the value of greater than 1,000,000 won to a cyber
pass or buy more than 100 cards, contact:
   E_mail    : center@cyberpass.com
   Telephone: (02)-2220-1999
   FAX       : (02)-2220-1929

▶ Enter user information (Compulsorily fill in all the blank items marked
by *)
   Name             _____ *
   Resident number  _____ *
   Telephone number _____ *
   E-mail           _____
   Post code        _____ *   [Lookup]
   Address          _____ *

Enter accurate data. Or you cannot participate in bonus event.

Purchase

FIG. 10B

PURCHASE/USE OF CYBER PASS           PAYMENT OF CYBER PASS

Hong's order description

| Item | Number of cards | Amount |
|---|---|---|
| 5,000-won valued card | 3 | 15,000 won |
| 30,000-won valued card | 2 | 60,000 won |
| Total amount ordered | 5 | 75,000 won |

▶ PAYMENT MEANS- Select payment method
    CREDIT CARD    BANK ACCOUNT    TOPOGRAPHIC TRANSFER

FIG. 10C

Hong's purchase description as of November 25, 1999

| Item | Number of cards | Amount |
|---|---|---|
| 5,000-won valued card | 3 | 15,000 won |
| 10,000-won valued card | 2 | 20,000 won |
| Total amount ordered | 5 | 35,000 won |

| Item | PIN No. | | |
|---|---|---|---|
| 5,000-won valued card | 90345678**** | For user | For gift |
| 5,000-won valued card | 90345678**** | For user | For gift |
| 5,000-won valued card | 90345678**** | For user | For gift |
| 5,000-won valued card | 90345678**** | For user | For gift |
| 5,000-won valued card | 90345678**** | For user | For gift |

The purchase transaction has been completed.
OK

FIG. 10D

Registration of Cyber Pass

PIN#

Password  _____

Password confirmation  _____

Hint for password  _____
   (For recalling password when forgotten. (Ex: If the password
   is cyber pass, what is the best method for small-amount
   payment?)

RECHARGE OF Cyber Pass

PIN#   12345678 ****

Enter PIN#

FIG. 10G

PURCHASE/USE OF CYBER PASS          PAYMENT OR RECHARGED CYBER PASS
 - Recharge amount cannot exceed 1,000,000 won.
 - Recharge can be done one by one.

Card Data
 ▶ Balance                    50,000 won
 ▶ Recharge Amount            _____ won
 * Cyber pass can be recharged in 10,000 won unit.

Registration of User Information
If you register user information, you can enjoy a privilege of point accumulation. If you have already registered user information, you may skip registration procedure.
If there is a change in user information or the cyber pass is given as a gift, the card holder can enjoy a privilege of point accumulation.

Name
   Resident Number
   Telephone No.
   E-mail
   Postal code                          Inquiry
   Address 1
   Address 2

▶ Payment means - Select payment method.
         CREDIT CARD      BANK ACCOUNT       TELEGRAPHIC TRANSFER

* It is not allowed to use a cyber pass in purchasing or recharging another cyber pass.

FIG. 10H

PURCHASE/USE OF CYBER PASS　　　　　　　　　INQUIRY OF USAGE TRANSACTION

USAGE TRANSACTION DESCRIPTION OF CYBER PASS NO. 39973575-xxxx

The usage transaction description of cyber pass No. 39973575-xxxx is summed up and provided by customer behavior from the purchase date to date.
For more information, press button 'INQUIRY' below.
It is not allowed under the Communication Law to provide through the PC screen detailed usage description for services to be paid by a payment method other than Internet payment. If you still need the detailed usage description, you may inquire of customer service center.

Customer Service Center : center@cyberpass.com
Telephone No.: 02-2220-1926

| Description of usage transaction | Date | (Unit: one)<br>Amount of usage transaction |
|---|---|---|
| Initial amount of cyber pass issued | Feb. 15, 2000 | +5,000 |
| Validity | May 8, 2001 | |
| Charge amount | May 8, 2000 | +10,000 |
| Charge amount | Mar. 22, 2000 | +10,000 |
| Charge amount | Mar. 22, 2000 | +10,000 |
| Charge amount | Mar. 22, 2000 | +10,000 |
| Charge amount | Mar. 22, 2000 | +10,000 |
| Total amount refunded | | +0 |
| Total amount of Internet payment | | -5,000 |
| Total amount of telephone calls used | | 105 |
| Total amount of telephone information services used | | 0 |
| Total amount of prepaid mobile phone calls used | | 0 |
| Balance | | 49,895 |

* Hong's points accumulated totaled 15500 points.

For more information, press button 'Inquiry of detailed description'

Inquiry of detailed description

For a promotional cyber pass, a prescribed validity is applicable and is automatically extendible every one year on recharging.

| Detailed description of usage transaction | | (Unit: won) |
|---|---|---|
| Description of usage transaction | Date | Amount of usage transaction |
| e-lotto | Feb. 15, 2000 | 5,000 |
| 1020shop | Feb. 27, 2000 | 5,000 |
| I-Link Communica Co., Ltd | Feb. 20, 2000 | 5,000 |
| IDDR (shopplazza) | Feb. 28, 2000 | 5,000 |
| Flower delivery service "Flower Land" | Feb. 28, 2000 | 5,000 |
| Korea Internert Lottery Co., Ltd | Feb. 28, 2000 | 5,000 |
| Total amount of Internet Payment | | 25,000 |
| Total amount refunded | | 0 |

ELECTRONIC PAYMENT SYSTEM USING MULTIFUNCTIONAL PREPAID CARDS AND METHOD OF SELLING PREPAID CARDS

BACKGROUND OF THE INVENTION

1. Field of the Invention

The present invention relates to an electronic payment system for a multifunctional prepaid card that can be commonly used in payment for both purchasing various goods and using various services, and a method of selling the multifunctional prepaid card.

2. Background Art

In recent years, according to an explosive growth in users of the Internet owing to the simplicity of Hyper-Text Markup Language (HTML) based World Wide Web (WWW) and the development of multimedia technology, there have been developed numerous applications to offer a variety of services in Cyberspace. In particular, since various kinds of cyber shopping malls emerged over the Internet, much attention has been paid to electronic commerce systems and electronic payment methods and systems essentially accompanied by the electronic commerce are being intensively studied.

Digital cash and credit cards are payment means that are most widely used in the virtual space. Also, prepaid cards have been in widespread payment means exclusively used in connection with calling service, rather than the Internet service.

Although the digital cash is electronic money exclusively used for the Internet, that is, capable of being used over the Internet instead of cash, it is quite a complicated procedure to use the digital cash. In the case of using credit cards as payment means, transaction statements or private personal information may be divulged or may be fraudulently used by hacking. Also, since the teenagers who are target users of the Internet cannot hold credit cards and credit card number, and authorization for payment are chargeable, credit cards are not suitable for payment of a small amount. Further, conventional prepaid cards can only be used in limited services, such as calling services.

SUMMARY OF THE INVENTION

It is an object of the present invention to provide an electronic payment system for a multifunctional prepaid card which can be used as an integrated payment means for small-amount payment in chargeable sites or shopping malls over the Internet, chargeable contents for PC communications, or prepaid voicemail service, as well as general functions as prepaid cards used for payment of local/long-distance/mobile/international calling services, based on a single Personal Identification Number (PIN), and a method for selling the multifunctional prepaid card.

To accomplish the above object of the present invention, there is provided an electronic payment system including a multifunctional prepaid card having a predetermined Personal Identification Number (PIN), shopping/service providing means for providing services and goods to a user of the multifunctional prepaid card and requesting the PIN of the multifunctional prepaid card for payment, and a prepaid card management system for managing state/balance information for PIN for the multifunctional prepaid card on a database, making a settlement by referring to the balance amount of the corresponding PIN if payment for a specific PIN is requested by the shopping/service providing means, and updating the settlement result on the database, wherein a single prepaid card can be comprehensively used in payment for use of various services and purchase of goods.

According to another aspect of the present invention, there is provided a method of selling a multifunctional prepaid card including the steps of accessing a cyber card site over the Internet and selecting a card selling site, inputting predetermined order information and a payment method for payment for purchase of the multifunctional prepaid card, making a payment by the selected method and allocating a PIN, if a 'For gift' option is selected, transferring the purchased prepaid card to a party designated by the user, and if an 'For user' option is selected, entering a password and activating the corresponding PIN.

BRIEF DESCRIPTION OF THE DRAWINGS

The above object and advantages of the present invention will become more apparent by describing in detail a preferred embodiment thereof with reference to the attached drawings in which:

FIGS. 10A through 10I illustrate examples of screens displayed based on various functions run by the present invention.

DESCRIPTION OF THE INVENTION

A preferred embodiment of the present invention will now be described with reference to the accompanying drawings.

First, a multifunctional prepaid card system used in the present invention is an integrated multifunctional prepaid card system which enables payment for various services such as Internet shopping malls whose transaction volumes are tremendously increasing nowadays, small-amount payment in chargeable sites or chargeable contents for PC communications, prepaid voicemail service or the like, and which functions as a prepaid card used for mobile phone services. In other words, the multifunctional prepaid card according to the present invention can be commonly used in payment for usage of various services including the Internet service, calling services, prepaid voicemail service, PC communications, mobile phone services, and for buying various goods.

Figure 1:
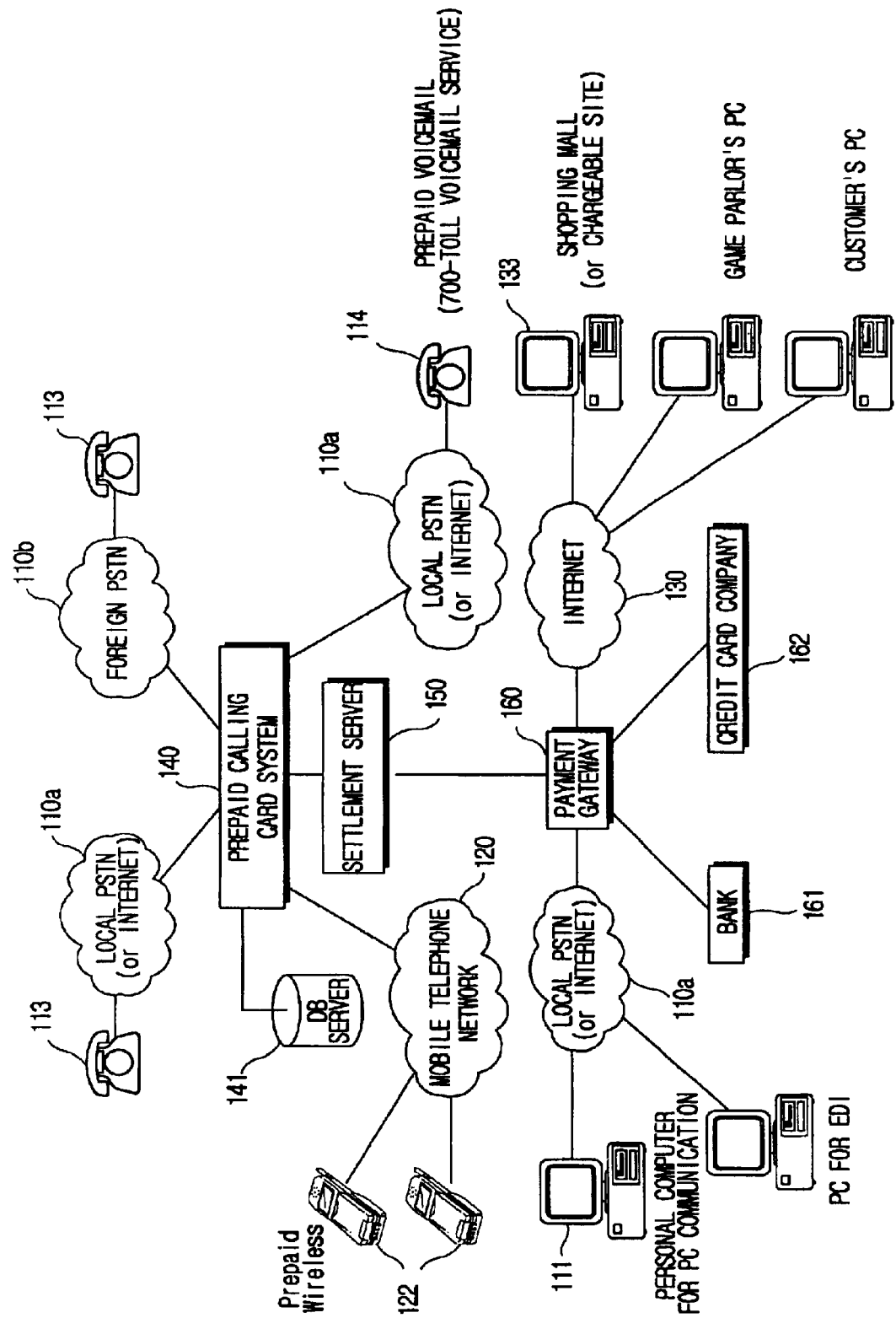
FIG. 1 illustrates an overall configuration of an electronic payment system according to the present invention.

FIG. 1 illustrates an overall configuration of an electronic payment system according to the present invention.

Referring to FIG. 1, the electronic payment system according to the present invention includes a local Public Switched Telephone Network (PSTN) 110a, a mobile telephone network 120, the Internet 130 and a foreign PSTN 10b. Also, the electronic payment system according to the present invention includes a prepaid calling card system (PCCS) 140, a settlement server 150 and a payment gateway (G/W) 160. The payment G/W 160 is connected to a bank 161 and a credit card company 162. A personal computer 111 for PC communications and a computer 112 for Electronic Data Interchange (EDI), a public telephone set 113 and a prepaid voicemail system 114 are connected to the PSTNs 110a and 110b. A customer PC 131, a game parlor's PC 132 and a shopping mall or chargeable site 133 are connected to the Internet 130. Prepaid wireless phones 122 are connected to the mobile telephone network 120. The PCCS 140 is implemented by an intelligent network platform and has a database (DB) server 141 connected thereto.

In the above-described configuration, integrated payment can be made for mobile phone services, PSTN services, PC communication services, prepaid voicemail services, chargeable Internet site accessing, purchase in the Internet shopping mall and so on, using the multifunctional prepaid card according to the present invention.

Figure 2:
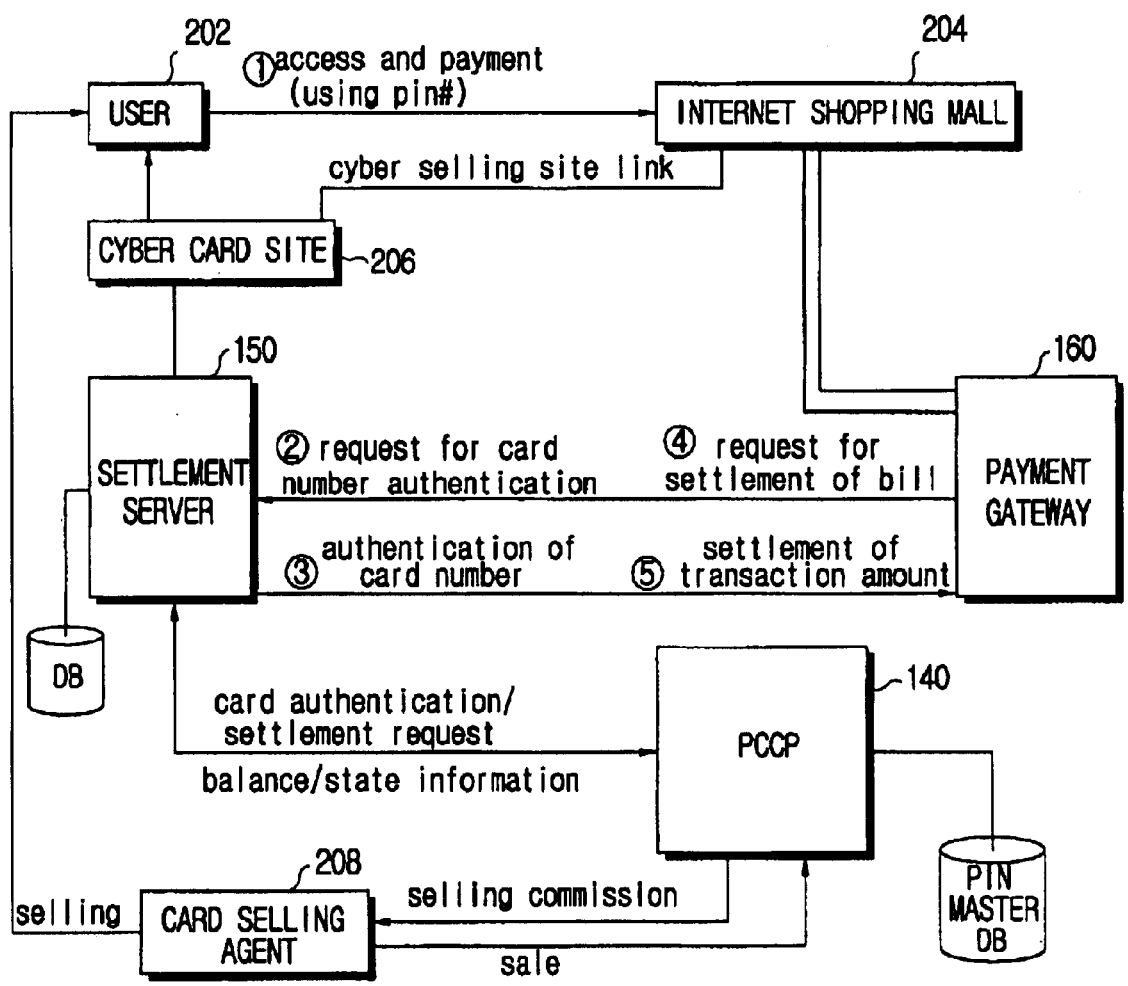
FIG. 2 is a flow diagram illustrating an operational procedure of an electronic payment system according to the present invention.

FIG. 2 is a flow diagram illustrating an operational procedure of an electronic payment system according to the present invention, in which a user 202, an Internet shopping mall 204, a cyber card site 206, a card selling agent 208, a PCCP 140, a settlement server 150 and a payment G/W 160 are shown by virtue of operational relationship between the respective operating bodies.

Referring to FIG. 2, the user 202 purchases a multifunctional prepaid card having a predetermined monetary value at the cyber card site 206 or the card selling agent 208. Here, the monetary units of the multifunctional prepaid card include a 5,000-won valued card, 10,000-won valued card, 20,000-won valued card, 30,000-won valued card, 50,000-won valued card and 100,000-won valued card. In the case of purchasing the multifunctional prepaid card at the card selling agent 208, a real prepaid card is provided to the user 202. In the case of purchasing the multifunctional prepaid card at the cyber card site 206, a virtual prepaid card is given to the user 202 over the Internet. The user 202 who purchased the multifunctional prepaid card can make payment immediately after using various chargeable services, such as calling services, Internet services or PC communication services, as described above.

For example, when the user 202 accesses an Internet chargeable site or the Internet shopping mall 204, the user 202 enters a Personal Identification Number (PIN)(to be abbreviated as PIN# hereinafter) for payment. The accessed Internet shopping mall 204 requests authentication of the PIN# to the settlement server 150 through the payment G/W 160. The settlement server 150 exchanges the information with the PCCS 140 and transfers the authentication result of the PIN# to the Internet shopping mall 204 via the payment G/W 140. After the user 202 uses the service, billing for using the service is requested to the settlement server 150 through the payment G/W 160. Then, the settlement server 150 communicates with the PCCS 140 for settlement and then notifies the settlement result to the shopping mall 204 through the payment G/W 160. In the preferred embodiment of the present invention, the settlement server 150 and the PCCS 140 are separately processed for the sake of fast and convenient implement of the invention. However, the settlement server 150 and the PCCS 140 may run on a single computer, and even the payment G/W 140 may also be incorporated therein.

Figure 3:
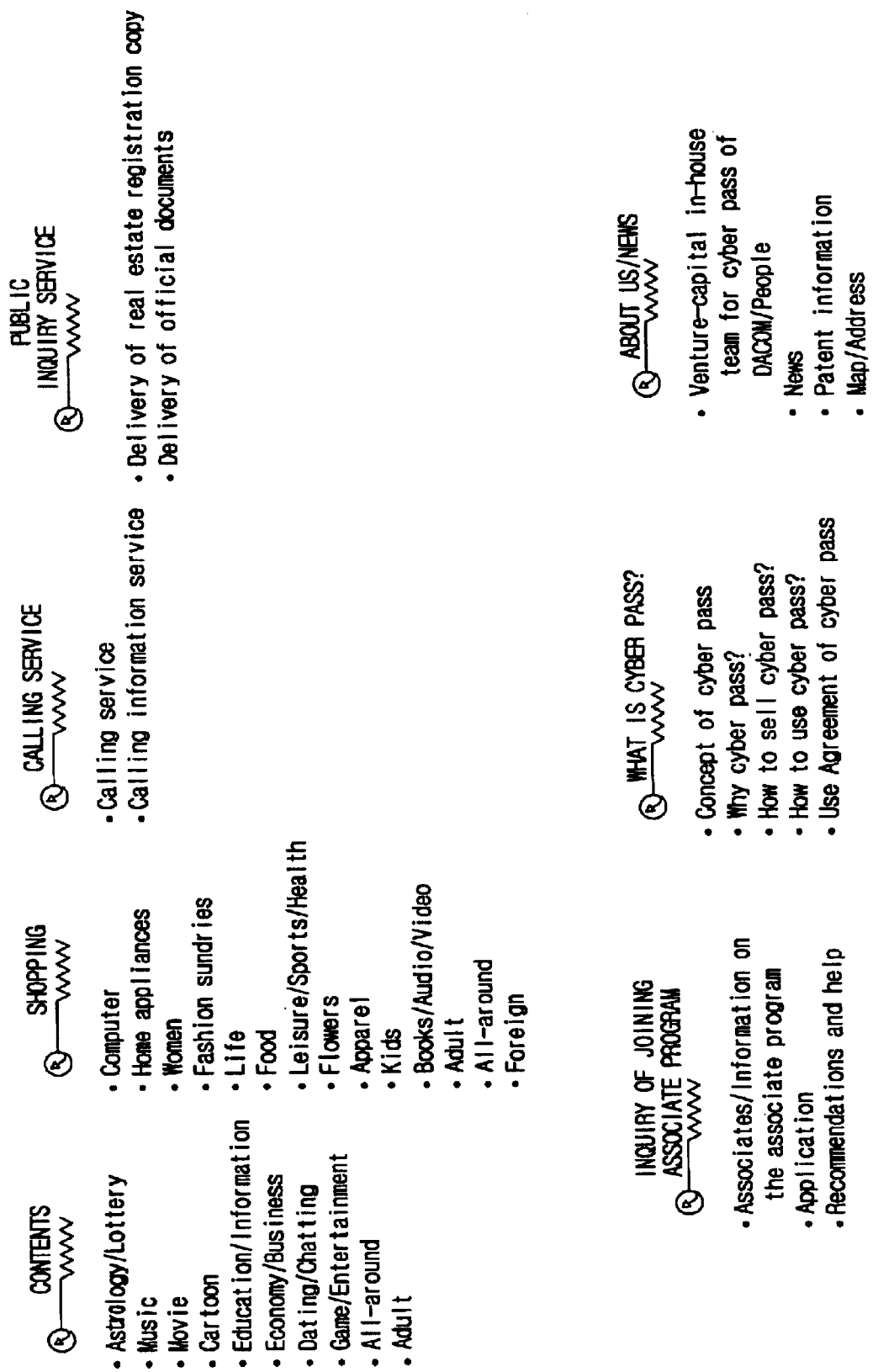
FIG. 3 illustrates a site map in the case of constructing a home page of a cyber card site according to the present invention.

FIG. 3 illustrates a site map in the case of constructing a home page of a cyber card site according to the present invention. Referring to FIG. 3, the cyber card site includes major options including Purchase of Multifunctional Prepaid Card (expressed as 'Cyber Pass' on the drawing), Recharging of Cyber Pass, Registration/Change of Password, Change of User Information, Inquiry of Use Statement, Verification of Online Payment or Refund of Balance, and incidental options including Contents, Shopping, Calling Service, Public Inquiry Service, What is Cyber Pass? or About Us/News.

The procedure of purchasing the cyber pass will later be described with reference to FIG. 4, and the procedure of recharging the cyber pass will be described with reference to FIG. 5. The option of 'Registration/Change of Password' is for newly registering a password prior to use of the purchased cyber pass or changing the already registered password. The option of "Change of User Information' is for changing the user information entered when purchasing the cyber pass.

The options of 'Contents' include Astrology/Lottery, Music, Movie, Cartoon and so on to provide useful contents. The options of 'Shopping' include Computer, Home appliances, Women, Fashion/accessories and so on. The options of 'Calling service' include Calling service and Calling information service. The options of 'Public Inquiry Service' include Delivery of real estate registration copy and Delivery of official document. The options of 'Inquiry of Joining Associate Program' include Associates/Information on the associate program, Application, and Recommendations and Help. The options of 'What is Cyber Pass?' include Concept of Cyber Pass, Why cyber pass?, How to sell cyber pass?, How to use cyber pass?, and Use Agreement of Cyber Pass. The options of 'About Us/News' include company related information.

Figure 4:
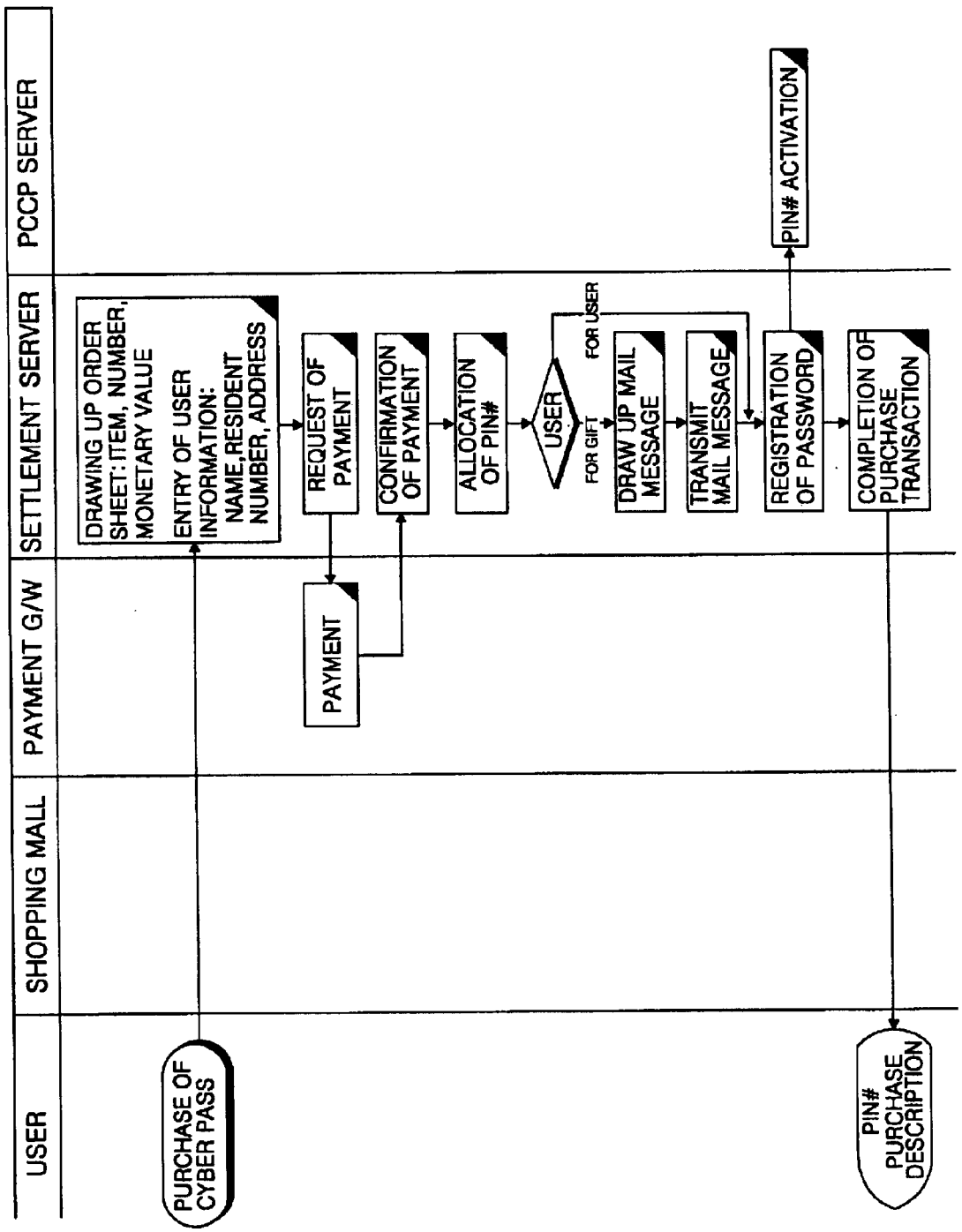
FIG. 4 illustrates a procedure of selling a multifunctional prepaid card according to the present invention.

FIG. 4 illustrates a procedure of selling a multifunctional prepaid card according to the present invention through a cyber card site.

A user accesses the cyber card site run on a settlement server to enter a site selling a multifunctional prepaid card, that is, cyber pass. Then, the user makes an entry of information such as item, number or monetary value, on an order sheet shown in FIG. 10A, and then enters user information including name, resident number and address, and a payment method, using the screen shown in FIG. 10B.

Then, if the payment method is credit card payment, the user enters credit card number and password. If the payment method is bank account payment, the user enters bank account number and password. Then, the billing request is made. The payment is made by a payment gateway and then confirmed. Then, as shown in FIG. 10C, PIN# corresponding to the respective bills is allocated.

Figure 10D:
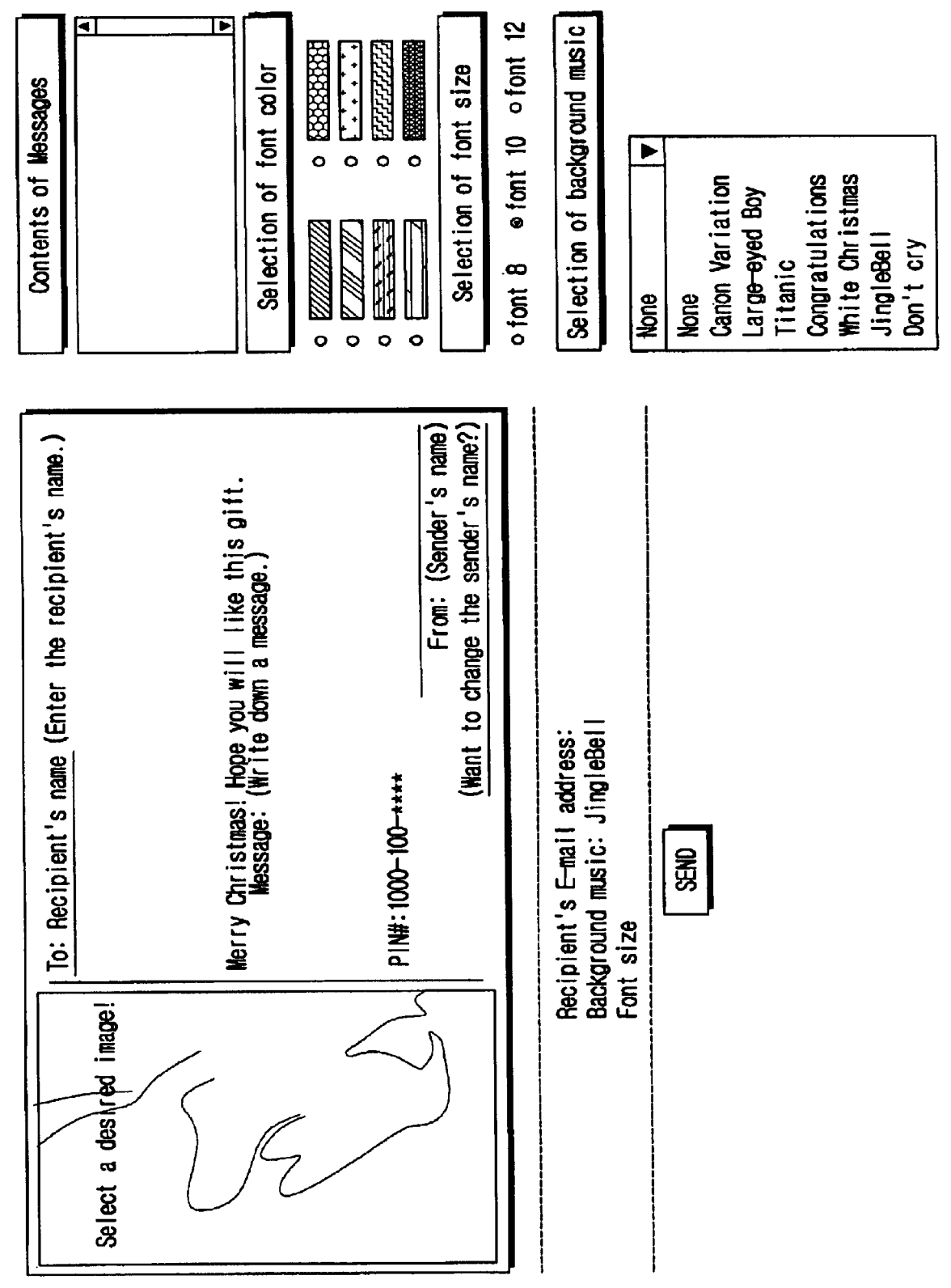

Thereafter, the user is allowed to select an option of either 'For gift' or 'For user', and if the 'For gift' option is selected, a recipient and a cyber pass design are entered by the user, as shown in FIG. 10D and an e-mail message is prepared to then be transmitted to the recipient.

Figures 10E, 10F:

If the 'For user' option is selected, as shown in FIG. 10E, the user's password is registered and then the PIN# is activated by a PCCS server to complete the purchase procedure. After completion of the purchase procedure, the settlement server notified the purchase statement to the user.

Figure 5:
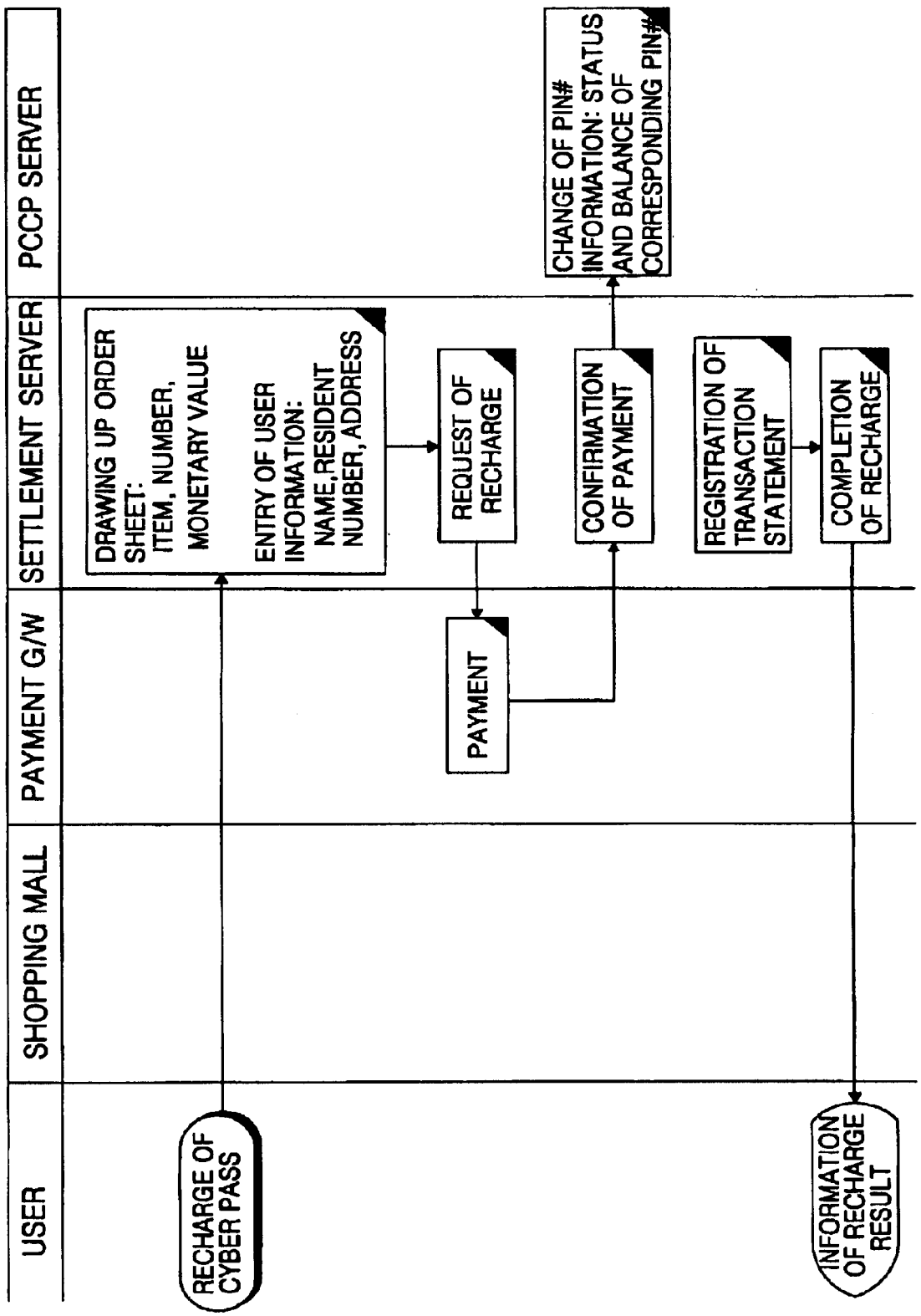
FIG. 5 is a flow diagram illustrating a procedure of recharging a multifunctional prepaid card according to the present invention.

FIG. 5 is a flow diagram illustrating a procedure of recharging a multifunctional prepaid card according to the present invention. Referring to FIG. 5, after the user accesses the cyber card site over the Internet in order to recharge the multifunctional prepaid card, the user accesses a recharge site. If the recharge site is accessed, a screen shown in FIG. 10F is displayed for entry of a PIN#. Next, as shown in FIG. 10G, the user information can be changed and the user is allowed to select a recharge amount, that is, the value amount to be added to the card, and a payment method.

Then, according to selection of the payment method, a screen for payment request is displayed. If there is a recharge request, payment is made through a payment gateway. After Alp confirming that payment has been made, the information of the corresponding PIN# is updated by the PCCS server and the balance and state information of the corresponding PIN# are transferred to the settlement server. The settlement server registers transaction statement on its database, completes recharge and then notifies the recharge result to the user.

Figure 6:
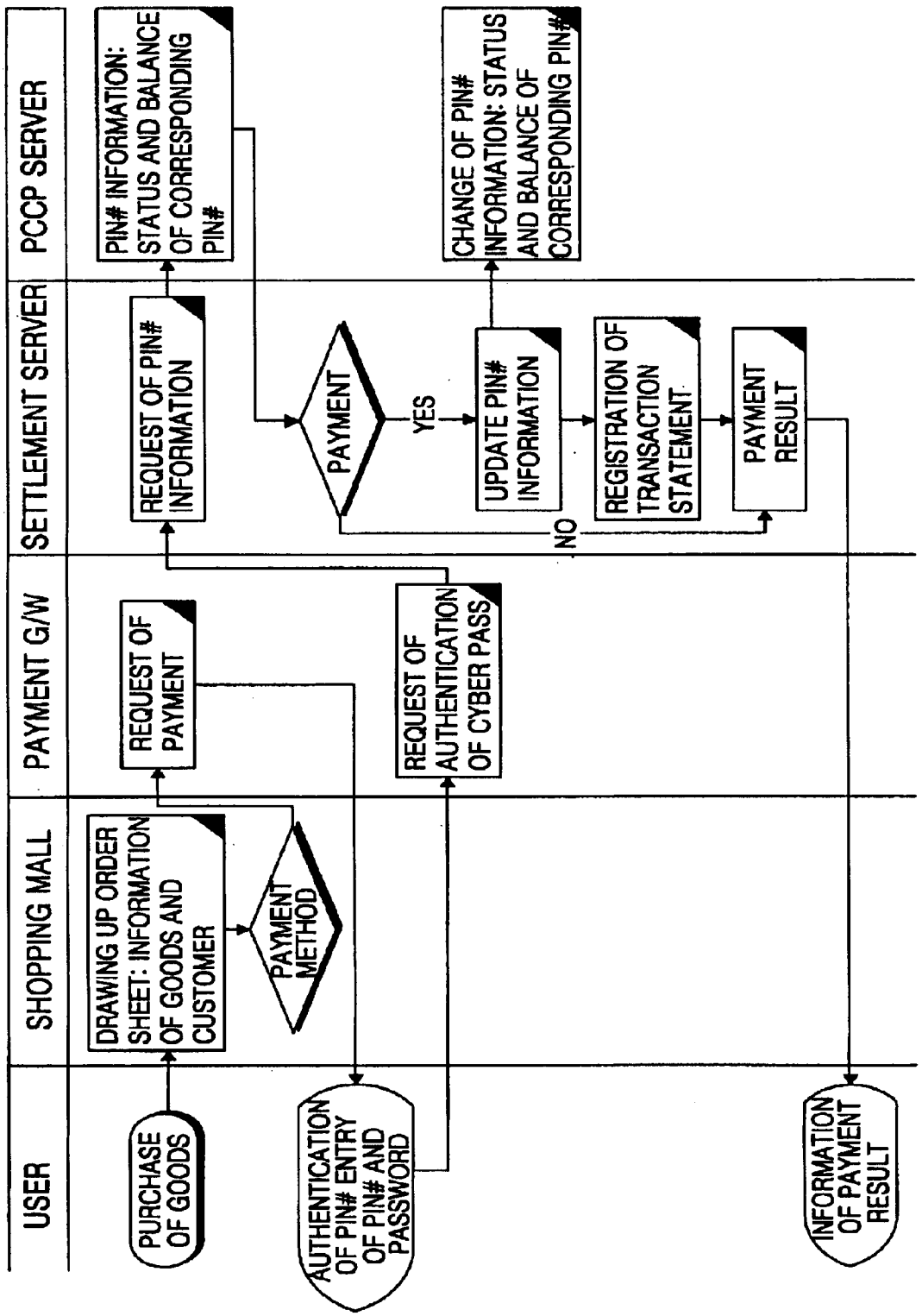
FIG. 6 is a flow diagram illustrating a procedure of buying goods using a multifunctional prepaid card according to the present invention.

FIG. 6 is a flow diagram illustrating a procedure of buying goods using a multifunctional prepaid card according to the present invention.

Referring to FIG. 6 after the user access an Internet shopping mall for purchasing goods, the order sheet provided by the shopping mall is filled out. If a multifunctional prepaid card according to the present invention is selected as a payment method, payment request is made to the payment gateway. The payment gateway receives a PIN# and password through a screen displayed on the shopping mall and requests authentication of the card to the settlement server. The settlement server requests the PIN# information and state and balance information to the PCCS server and then receives the information to determine whether payment is to be made. If it is determined that payment is possible, the PIN# information is updated, and the card information, that is, the state and balance information, is changed by the PCCS server. Then, the transaction statement is registered, and the payment result is notified to the user.

Figure 10I:
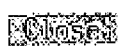

If the user accesses the site to request an inquiry of the information of usage details, the transaction statement and the information of usage details are offered to the user, as shown in FIGS. 10H and 10I.

Figure 7:
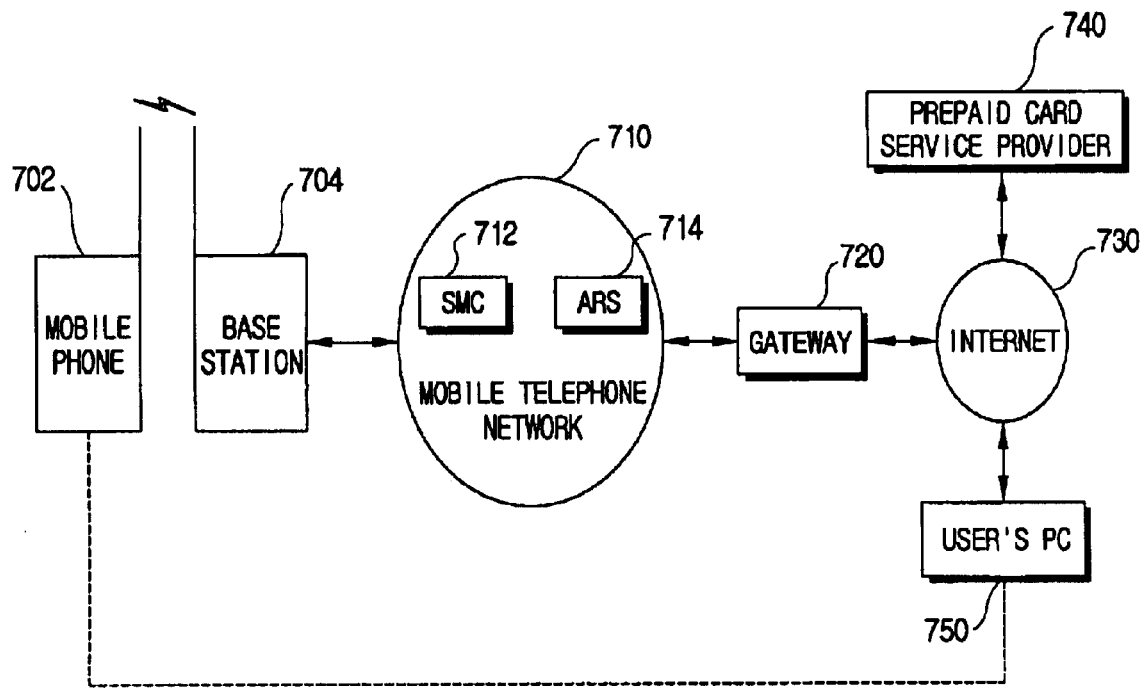
FIG. 7 illustrates a multifunctional prepaid card according to the present invention in using mobile telephone network.

FIG. 7 illustrates a network for distributing PIN# of a multifunctional prepaid card according to the present invention in using mobile telephone network. Referring to FIG. 7, a mobile phone 702 owned by the user, a base station 704, a mobile telephone network 710, a gateway 720, the Internet 730, a multifunctional prepaid card service provider 740, and a user's PC 750 are shown. Here, the mobile telephone network 710 includes a Short Message service Center (SMC) 712 for providing character messaging service, and an Automatic Response Service (ARS) system 714.

Referring to FIG. 7, the mobile phone 702 is connected to the mobile telephone network 710 through the base station 704 to make a direct call to a called party or to purchase the multifunctional prepaid card according to the present invention. Here, the prepaid card is distributed in the form of a PIN# through the Short Message Service (SMS). The mobile telephone network 710 provides general mobile communication services, SMS through the SMC 712 and ARS through the ARS system 714. The mobile telephone network 710 and the Internet 730 are connected through a gateway 720. The user can access a site of the multifunctional prepaid card service provider 740 through the Internet 730 using the user's PC 750. The multifunctional prepaid card service provider 740 operates a service site over the Internet and manages its associates (not shown) to provide PIN# to the mobile telephone network 710, thereby selling prepaid cards using a mobile phone.

Figure 8:
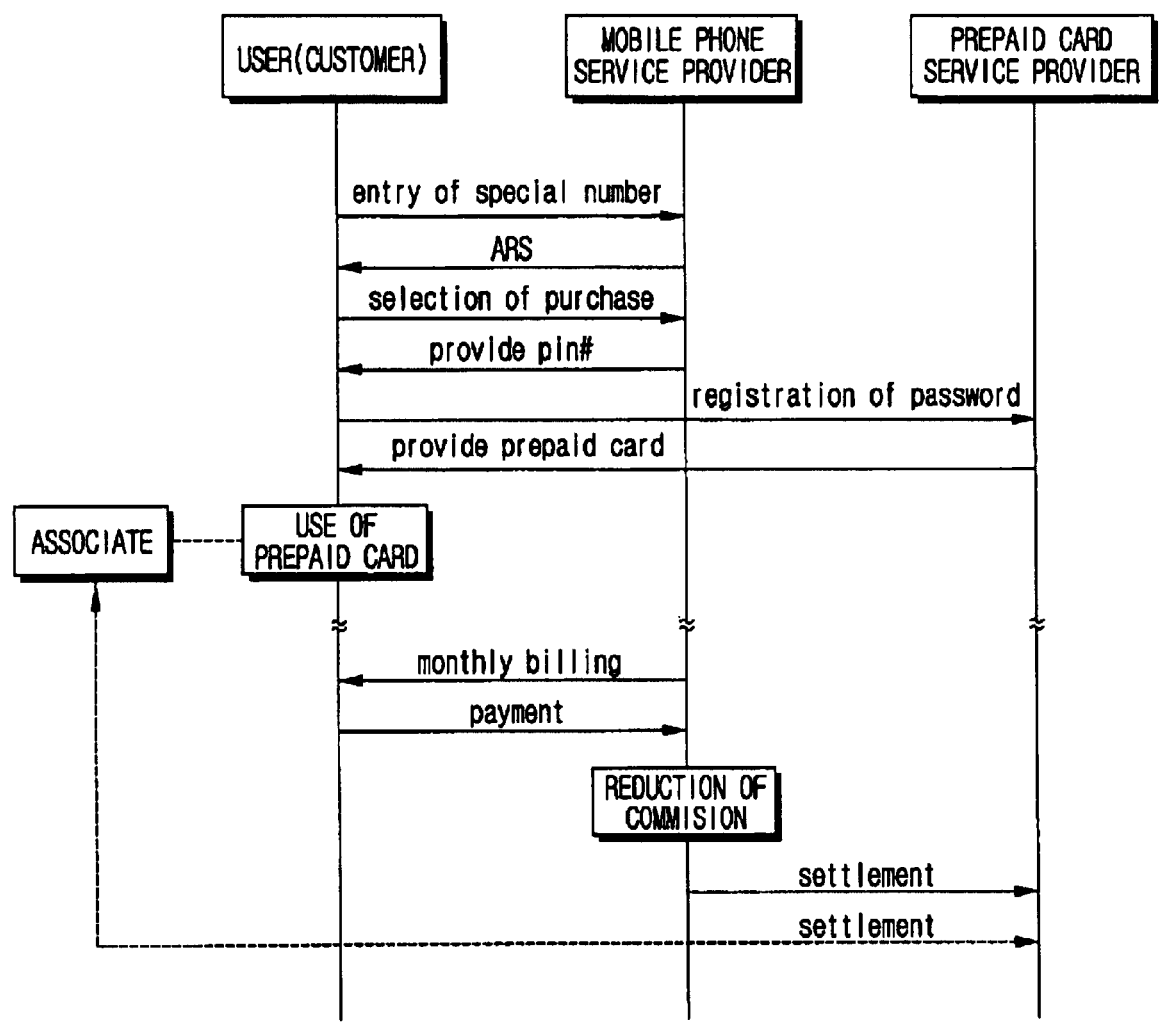
FIG. 8 is a flow diagram illustrating a procedure of using a multifunctional prepaid card according to the present invention by a mobile telephone network.

FIG. 8 is a flow diagram illustrating a procedure of using a multifunctional prepaid card according to the present invention by a mobile telephone network, in which the information flow between a user (customer), a mobile phone service provider and a prepaid card service provider is shown. First, the prepaid card service provider provides PIN# to the database of the mobile phone service provider. Then, the user enters a special number to access a site of the mobile phone service provider and the mobile phone service provider makes announcement through an ARS system so that the user select a desired service. If the user selects a 'Purchase of a Prepaid Card' option, a PIN# is extracted from a PIN# database to be provided to the user through a character message. Then, the user accesses a site of the prepaid card service provider and then registers a password. Accordingly, the prepaid card service provider authorizes the use of the purchased prepaid card.

The user can use the prepaid card at any associates and the mobile phone service provider charges the usage of phone services monthly together with the amount of the prepaid card purchased by the user. If the user makes payment for the bill, the mobile phone service provider offers the money to the prepaid card service provider, with a commission of a predetermined amount deducted, to complete adjustment. The prepaid card service provider adjusts the amount with its associates according to the users' detailed statement of usage of prepaid cards.

Figure 9:
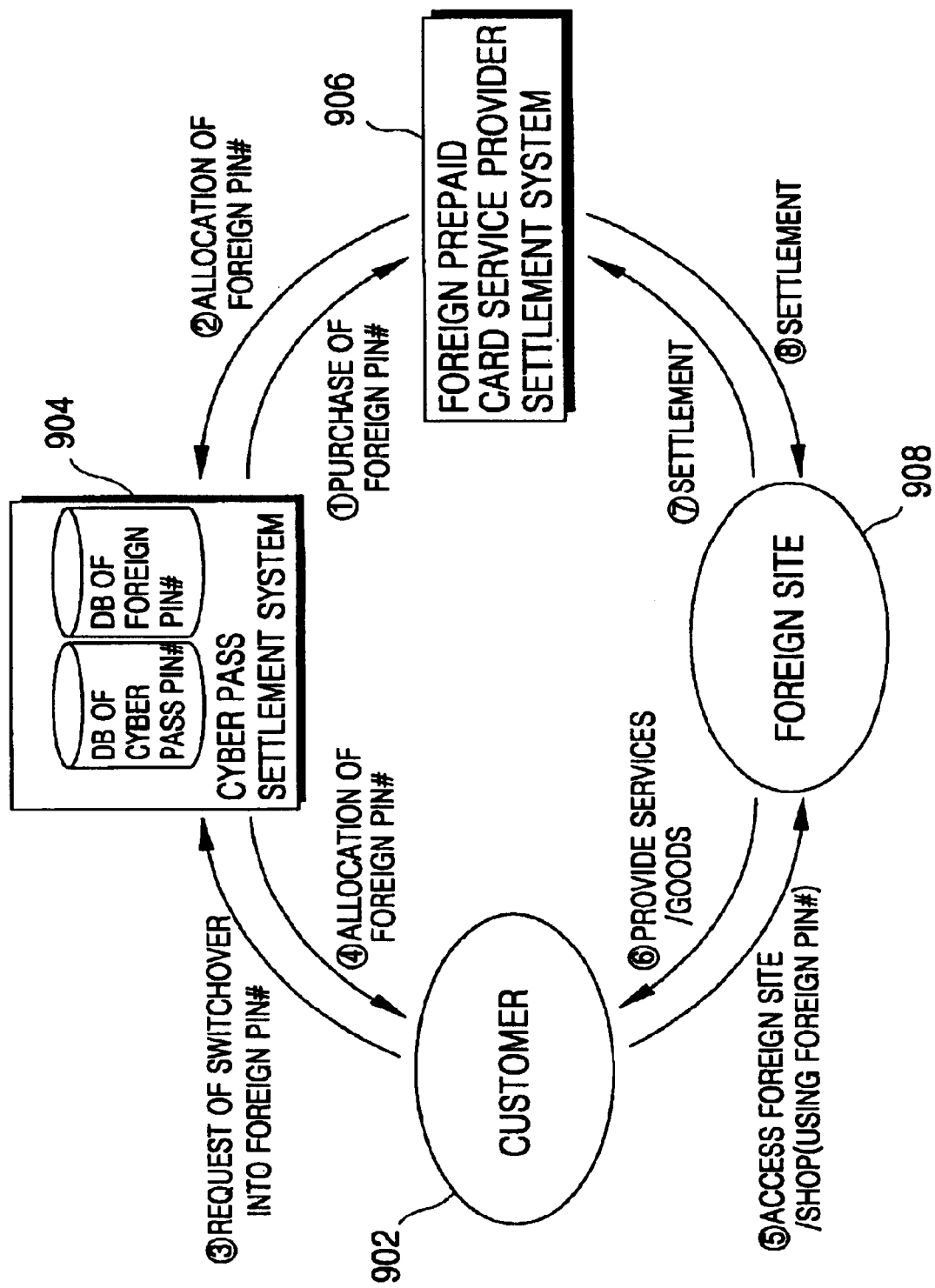
FIG. 9 is a flow diagram illustrating a procedure of accessing a foreign site using a multifunctional prepaid card according to the present invention.

FIG. 9 is a flow diagram illustrating a procedure of accessing a foreign site using a multifunctional prepaid card according to the present invention. In order for a customer 902 to access a foreign site 908 using a cyber pass according to the present invention, a foreign PIN# must be allocated to the customer 902. A cyber pass settlement system 904 must hold PIN# which can be used in foreign countries, to provide a foreign PIN# to the user in response to the customer's request, the PIN# given by paying a predetermined amount to a foreign card service provider settlement system 906.

Referring to FIG. 9, the cyber pass settlement system 904 requests a foreign prepaid card service provider settlement system 906 to provide foreign PIN#. According to the customer's request, the foreign prepaid card service provider settlement system 906 provides foreign PIN# to the cyber pass settlement system 904. If the cyber pass customer 902 requests switch-over into a foreign PIN#, the corresponding foreign PIN# having a monetary value as requested is allocated to the customer 902.

Then, the customer 902 accesses the foreign site 908 to purchase goods or use services using the foreign PIN#. Settlement for payment for goods and/or services used by the customer 902 is made between the foreign site 908 and the foreign prepaid card service provider settlement system 906.

As described above, the multifunctional prepaid card according to the present invention allows customers to use foreign sites using a foreign PIN# in cooperation with a foreign prepaid card service provider. Also, the customer may use the PIN# directly at a foreign site while making a settlement between the foreign site and a cyber pass settlement system.

Industrial Applicability

As described above, the multifunctional prepaid card system according to the present invention provides a variety of functions, including, real-time billing, recharge (adding the monetary value) of a card, inquiry of usage details, refund of balances, setting validity period of a card, mixing goods, and the like. Also, the prepaid cards can be varied according to users' request. In particular, a single prepaid card according to the present invention can be comprehensively used as payment means for chargeable sites over the Internet, such as MP3 sites, online movie or cartoon sites, stock sites, small-amount payment at cyber shopping malls for purchase of books or CDs, cyber gift coupon mailing, PC communications, or telephone voicemail services as well as telephone services.

What is claimed is:

1. An electronic payments system wherein a real or virtual multifunctional pre-paid card allocated a specific card number is issued to a user, and the user settles payment for goods or telephone and other services using the allocated card number of the prepaid card, the system comprising:

a master database for storing the card number and balance information of the pre-paid card issued to the user and managing the same;

a pre-paid calling card system connected to a telephone network and the master database for authenticating the pre-paid card, settling the authenticated pre-paid card and balancing from the balance information of the corresponding card number of the pre-paid card through inquiry to the master database when a request for settlement is received through the telephone network;

a settlement server being connected to a data communication network and the pre-paid calling card system for authenticating the pre-paid card, settling the authenticated pre-paid card and balancing from the balance information of the corresponding card number of the pre-paid card by inquiry to the master database through the pre-paid calling card system when a request for settlement is received through the data communication network; and a cyber card site for allocating a specific pre-paid card number and transferring the same to the user after settlement for purchase of the pre-paid card according to purchase request by the user through the Internet;

wherein payments of various goods, telephone and other services respectively requested through the telephone network and the data communication network being integrally carried out with the one pre-paid card through the master database.

2. The electronic payments system according to claim 1, wherein the cyber card site inquiring whether the pre-paid card purchased by the user is used by the user or is given to others as a gift from the user, and when chosen as a gift, transferring the card number of the purchased pre-paid card to an E-mail address of the other person being designated by the user.

3. The electronic payments system according to claim 1, wherein the cyber card site has a function for receiving the card number of the pre-purchased pre-paid card from the user in response to a recharge request from the user, wherein the user having access to the site through the Internet, and proceeding to settle payment for recharge relative to the received card number of the pre-paid card.

4. An electronic payments system wherein a real or virtual multifunctional pre-paid card allocated a specific card number is issued to a user, and the user settles payment for goods or telephone and other services using the allocated card number of the prepaid card, the system comprising:

a master database for storing the card number and balance information of the pre-paid card issued to the user and managing the same;

a pre-paid calling card system connected to a telephone network and the master database for authenticating the pre-paid card, settling the authenticated pre-paid card and balancing from the balance information of the corresponding card number of the pre-paid card through inquiry to the master database when a request for settlement is received through the telephone network;

a settlement server being connected to a data communication network and the pre-paid calling card system for authenticating the pre-paid card, settling the authenticated pre-paid card and balancing from the balance information of the corresponding card number of the pre-paid card by inquiry to the master database through the pre-paid calling card system when a request for settlement is received through the data communication network; and a cyber card site for allocating a specific pre-paid card number and transferring the same to the user after settlement for purchase of the pre-paid card according to purchase request by the user through the Internet;

wherein payments of various goods, telephone and other services respectively requested through the telephone network and the data communication network being integrally carried out with the one pre-paid card through the master database at bout the same time.

5. The electronic payments system according to claim 4, wherein the cyber card site inquiring whether the pre-paid card purchased by the user is used by the user or is given to others as a gift from the user, and when chosen as a gift, transferring the card number of the purchased pre-paid card to an E-mail address of the other person being designated by the user.

6. The electronic payments system according to claim 4, wherein the cyber card site has a function for receiving the card number of the pre-purchased pre-paid card from the user in response to a recharge request from the user, wherein the user having access to the site through the Internet, and proceeding to settle payment for recharge relative to the received card number of the pre-paid card.

7. An electronic payments system wherein a real or virtual multifunctional pre-paid card allocated a specific card number is issued to a user through a cyber card site for allocating a specific pre-paid card number and transferring the same to the user after settlement for purchase of the pre-paid card according to purchase request by the user through the Internet, and the user settles payment for goods or telephone and other services using the allocated card number of the prepaid card, the system consisting essentially of:

a master database for storing the card number and balance information of the pre-paid card issued to the user and managing the same;

a pre-paid calling card system connected to a telephone network and the master database for authenticating the pre-paid card, settling the authenticated pre-paid card and balancing from the balance information of the corresponding card number of the pre-paid card through inquiry to the master database when a request for settlement is received through the telephone network; and a settlement server being connected to a data communication network and the pre-paid calling card system for authenticating the pre-paid card, settling the authenticated pre-paid card and balancing from the balance information of the corresponding card number of the pre-paid card by inquiry to the master database through the pre-paid calling card system when a request for settlement is received through the data communication network;

wherein payments of various goods, telephone and other services respectively requested through the telephone network and the data communication network being integrally carried out with the one pre-paid card through the master database.

8. The electronic payments system according to claim 7, wherein the cyber card site inquiring whether the pre-paid card purchased by the user is used by the user or is given to others as a gift from the user, and when chosen as a gift, transferring the card number of the purchased pre-paid card to an E-mail address of the other person being designated by the user.

9. The electronic payments system according to claim 7, wherein the cyber card site has a function for receiving the card number of the pre-purchased pre-paid card from the user in response to a recharge request from the user, wherein the user having access to the site through the Internet, and proceeding to settle payment for recharge relative to the received card number of the pre-paid card.

* * * * *